(12) United States Patent
Black et al.

(10) Patent No.: US 8,340,996 B2
(45) Date of Patent: Dec. 25, 2012

(54) METHOD FOR ANALYZING MAINTENANCE OPERATIONS AND ASSESSING THE READINESS OF REPAIRABLE SYSTEMS

(75) Inventors: Scott Edwin Black, Godfrey, IL (US); Kirby Joe Keller, Chesterfield, MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 12/503,393

(22) Filed: Jul. 15, 2009

(65) Prior Publication Data

US 2009/0276276 A1 Nov. 5, 2009

Related U.S. Application Data

(62) Division of application No. 09/918,945, filed on Jul. 31, 2001, now Pat. No. 7,580,847.

(51) Int. Cl.
 *G06F 17/30* (2006.01)
(52) U.S. Cl. ...................................................... 705/7.11
(58) Field of Classification Search .................. 705/7, 8, 705/7.11
See application file for complete search history.

(56) References Cited

U.S. PATENT DOCUMENTS

| | | | |
|---|---|---|---|
| 5,614,896 | A | 3/1997 | Monk et al. |
| 5,778,381 | A * | 7/1998 | Sandifer ................................ 1/1 |
| 6,408,258 | B1 * | 6/2002 | Richer ........................... 702/182 |
| 6,606,546 | B2 | 8/2003 | Sinex |
| 7,269,569 | B2 * | 9/2007 | Spira et al. ........................ 705/7 |
| 2001/0032110 | A1 * | 10/2001 | Sinex ................................ 705/8 |

OTHER PUBLICATIONS

John "An Information Processing Study of a Complex Workflow in Aircraft Electronics Repair," Jun. 1984, Administrative Science, Quartely, pp. 255-274.*
Crow et al "Evaluating the Reliability of Repairable Systems) discloses the concept of using an intensity function to evaluate a system reliability", Dec. 1990, IEEE, pp. 275-279.*
Jeffrey, et al., *Logistics Support Planning Standardized Aviationics*, May 1989, Smith Industries, SLI Avionic.
Dialog (Aviation Improvements), Aug. 1993, Forecast International, Dialog File 11, Accession No. 00002929.
Scott E. Black, Steven E. Rigdon; Statistical Inference for A Modulated Power Law Process; Journal of Quality Technology; Jan. 1996; pp. 81-90; vol. 28, No. 1.
Dialog (Aerospace Flight Dynamics), May 1996, Forecast International/DMS, File 388, Accession No. 00004457, pp. 1-31.
Steven E. Rigdon, Asit P. Basu; Statistical Methods for The Reliability Of Repairable Systems; pp. 162-168; John Wiley & Sons, New York, New York, Copyright © 2000.

(Continued)

*Primary Examiner* — Romain Jeanty
(74) *Attorney, Agent, or Firm* — Alston & Bird LLP

(57) ABSTRACT

An automated method for assessing the readiness of a plurality of repairable systems, such as a fleet of aircraft, is provided. In addition to identifying the repairable systems that will be operational, the relative state of readiness of the repairable systems is determined such that the repairable systems that are most likely to successfully complete the designated task can be selected. Additionally, an automated method of analyzing the maintenance operations performed upon a plurality of repairable systems, such as a fleet of aircraft, is provided. In this regard, the relative states of readiness of the repairable systems are determined and maintenance resources are allocated based upon the respective measures of the relative states of readiness of the repairable systems. As such, maintenance operations scheduled for the aircraft that will have the greatest state of readiness upon completion of the maintenance operations can be prioritized.

10 Claims, 3 Drawing Sheets

OTHER PUBLICATIONS

Bard, et al., Optimization Aircraft Routing in Response to Groundings and Delays, Jul. 2000, *IEEE Transactions*, pps. 1-17.

Yuter, et al.; "TOGA COARE Aircraft Mission Summary Images: An Electronic Atlas"; Mar. 1995; Journal: Bulletin of the American Meteorological Society; vol. 76, No. 3, pp. 319-328.

* cited by examiner

METHOD FOR ANALYZING MAINTENANCE OPERATIONS AND ASSESSING THE READINESS OF REPAIRABLE SYSTEMS

CROSS REFERENCE TO RELATED APPLICATIONS

This application is a divisional of U.S. patent application Ser. No. 09/918,945, filed Jul. 31, 2001, now U.S. Pat. No. 7,580,847, which is hereby incorporated herein in its entirety by reference.

FIELD OF THE INVENTION

The present invention relates generally to methods, systems and computer program products for analyzing maintenance operations and assessing the readiness of a plurality of repairable systems, such as a fleet of aircraft.

BACKGROUND OF THE INVENTION

Many electromechanical systems must periodically undergo maintenance. For example, an electromechanical system may fail during operation so that maintenance is required in order to repair the electromechanical system and to return the electromechanical system to operation. Alternatively, an electromechanical system may periodically undergo scheduled maintenance in order to reduce the likelihood that the electromechanical system will fail unexpectedly during operation. For example, aircraft generally include a large number of subsystems that must be maintained, preferably in accordance with a predefined maintenance schedule.

In some situations, a plurality of electromechanical systems of the same type are available for performing a particular function. For example, a mission may require that a plurality of aircraft be deployed on a particular day. In order to provide proper resource allocation, such as proper allocation of the aircraft, the availability of the electromechanical systems must be determined. For example, the availability of the aircraft on the date of the mission must be determined in order to properly identify the aircraft to fly the mission. For those electromechanical systems currently undergoing maintenance or scheduled to undergo maintenance prior to the date of deployment, it must therefore be determined if sufficient maintenance operations will have been performed such that the electromechanical system will be available.

In evaluating the status of electromechanical systems following completion of the maintenance operations, the electromechanical systems are generally considered to be either in the same state as immediately prior to the commencement of the maintenance operations, i.e., as bad-as-old, or in a like-new condition, i.e., as good-as-new. These assumptions are generally somewhat incorrect, however, since the status of an electromechanical system following completion of the maintenance operations is generally somewhere between as bad-as-old and as good-as-new. For example, in instances in which the maintenance operations repair an electromechanical system that failed during operation, the electromechanical system is generally in better shape than immediately prior to the failure and, as such, will likely operate without failure for a longer period of time. However, even after the completion of the maintenance operations, the electromechanical system will likely not be in like-new condition and will generally be expected to fail in a somewhat shorter period of time than a new electromechanical system.

In order to more accurately determine the status of an electromechanical system following the completion of maintenance operations, a technique that applies a modulated power law process was described by Scott E. Black, et al., "Statistical Inference for a Modulated Power Law Process," Journal of Quality Technology, Vol. 28, No. 1, pp. 81-90 (January 1996). In this regard, the Black article describes a technique in which the relative status of an electromechanical system following the completion of maintenance operations could be determined across a continuum extending from as good-as-new to as bad-as-old. The contents of the Black article are incorporated by reference herein.

Unfortunately, conventional resource allocation techniques have not taken into account the relative status or operability of an electromechanical system, but have instead, merely focused upon the identification of those electromechanical systems that will be operable on the date of deployment. With respect to mission requests that identify a number of aircraft required to fly a particular mission on a predetermined date, aircraft are selected for the mission from among those that will be operational on the predetermined date of the mission without any consideration as to the relative status or degree of readiness of the aircraft. In determining the availability of the aircraft, a minimum equipment list is typically utilized to identify a number of subsystems that must be functioning in order for the aircraft to be cleared to fly. As such, aircraft that have the minimum equipment identified by the minimum equipment list would be identified as a candidate for the mission without any indication as to the relative degree of readiness of the aircraft and its respective subsystems.

Since mission commanders not only wish to begin a mission, but to complete the mission as successfully as possible, it would be useful to not only identify the aircraft that are operational and available on the predetermined date of the mission, but also to provide some indication as to the relative degrees of readiness of the aircraft. As such, the mission commander could select those aircraft that have the greatest likelihood of successfully completing the mission without failure of one or more aircraft subsystems. To date, however, mission commanders are not provided with information relating to the relative degrees of readiness of the aircraft.

SUMMARY OF THE INVENTION

An automated method, system and computer program product for assessing the readiness of a plurality of repairable systems, such as a fleet of aircraft, are therefore provided. In addition to identifying the repairable systems that will be operational, the method, system and computer program product of this aspect of the present invention also determine the relative state of readiness of the plurality of repairable systems such that the repairable systems that are most likely to successfully complete the designated task can be selected. Additionally, an automated method of analyzing the maintenance operations performed upon a plurality of repairable systems, such as a fleet of aircraft, is provided. According to this aspect of the present invention, the relative states of readiness of the plurality of repairable systems are determined and maintenance resources are allocated based upon the respective measures of the relative states of readiness of the repairable systems. As such, maintenance operations scheduled for the aircraft that will have the greatest state of readiness upon completion of the maintenance operations can be prioritized.

According to one aspect of the present invention, an automated method, system and computer program product for assessing the readiness of a plurality of repairable systems are provided. According to this aspect, at least one system allocation request is received. The system allocation request typically includes a date and the number of systems to be allocated to the task. The relative states of readiness of the plurality of repairable systems are then automatically determined. In this regard, the relative states of readiness are determined by analyzing maintenance information associated with the repairable systems to determine the repairable systems that will be operational on the date of the requested system allocation. In addition, the relative states of readiness are determined by ascertaining respective measures of the relative states of readiness of the repairable systems that will be operational on the date of the requested system allocation based upon respective probabilities of failure of the repairable systems following completion of the maintenance operations. In this regard, a determination of the respective measures of the relative states of readiness of the repairable systems on the date of the requested system allocation may be based upon an intensity function appropriate for the type of process, such as a modulated power law process, a gamma renewal process, a homogenous Poisson process or a power law process, that describes the probability of failure of the repairable systems.

Based upon the relative states of readiness of the repairable systems, the systems that will be operational on the date of the requested system allocation will be identified. In addition, the respective measures of the relative states of readiness of the repairable systems identified to be operational on the day the requested system allocation will be provided. As such, in addition to merely identifying systems that will be operational on the date of the requested system allocation, the systems having the greatest state of readiness on the date of the requested system allocation can be identified. As such, the systems that are most capable of successfully completing the task can be selected to perform the task, thereby maximizing the likelihood of successful completion of the task. According to this aspect of the present invention, a modification of the system allocation request may also be proposed in order to increase the relative states of readiness of the systems identified to be operational on the date of the modified system allocation request in comparison to the relative states of readiness of the systems identified to be operational on the date of the original system allocation request.

According to one advantageous embodiment, an automated method, system and computer program product are provided for assessing the readiness of a fleet of aircraft, each of which is comprised of a plurality of repairable subsystems. According to this embodiment, at least one mission request is received that includes a date and a number of aircraft. Relative states of readiness of a plurality of aircraft are then determined by automatically analyzing maintenance information associated with the plurality of aircraft. Aircraft that will be operational on the date of the requested mission are then identified and respective measures of the relative states of readiness of these aircraft are then provided. In this regard, the aircraft that have the greatest likelihood of completing the requested mission may be identified and modifications of the mission request may be proposed in order to increase the relative states of readiness of the aircraft operational on the date of the modified mission in comparison to the relative states of readiness of the aircraft operational on the date of the requested mission. In order to determine the relative states of readiness, the respective probabilities of failure of the aircraft following completion of the maintenance operations may be considered. More particularly, the respective measures of the relative states of readiness of the aircraft may be based upon an intensity function appropriate for the type of process that describes the probability of failure of the aircraft.

According to another aspect of the present invention, an automated method of analyzing maintenance operations performed upon a plurality of repairable systems is provided. According to this aspect, maintenance information associated with the plurality of repairable systems is initially analyzed to determine the relative states of readiness of a plurality of repairable systems. Respective measures of the relative states of readiness of the repairable systems are then determined based upon the respective probabilities of failure of the repairable systems following completion of the maintenance operations. Maintenance resources are then allocated based upon the respective measures of the relative states of readiness of the plurality of repairable systems. In this regard, maintenance operations scheduled for the repairable systems that will have the greatest states of readiness upon completion of the maintenance operations may be prioritized. As before, the determination of the relative states of readiness may be based upon respective probabilities of failure of the repairable systems following completion of the maintenance operations. In this regard, the respective measures of the relative states of readiness of the repairable systems may be based upon an intensity function appropriate for the type of process that describes the probability of failure of the repairable system.

In one embodiment, the automated method of analyzing maintenance operations analyzes maintenance operations performed upon the fleet of aircraft. In this regard, the maintenance information associated with the plurality of aircraft is initially analyzed to determine the relative states of readiness of the aircraft upon completion of the maintenance operations scheduled for the aircraft. Respective measures of the relative states of readiness of the aircraft upon completion of the maintenance operations scheduled for the plurality of aircraft are then provided and maintenance resources are allocated based upon the respective measures of the relative states of readiness of the aircraft. As before, maintenance resources may be allocated by prioritizing the maintenance operations scheduled for the aircraft that will have the greatest state of readiness upon completion of the maintenance operations.

By not only identifying the repairable systems that will be operational on the date of deployment, but providing respective measures of the relative states of readiness of the repairable systems, the repairable systems that will have the greatest likelihood of successfully completing the task can be selected, thereby maximizing the probability that the task will be successfully completed. For example, the aircraft that have the greatest likelihood of successfully completing a mission can be selected in an educated manner based upon the relative states of readiness of the aircraft which, in turn, is based upon the probability of failure or, conversely, success of the aircraft. Additionally, allocation of maintenance resources may be improved according to another aspect of the present invention by analyzing the relative states of readiness of the plurality of repairable systems, such as a plurality of aircraft, upon the completion of the maintenance operations and then scheduling the maintenance resources in such a way that the repairable systems that have the greatest states of readiness are repaired initially.

BRIEF DESCRIPTION OF THE DRAWINGS

Figure 1:
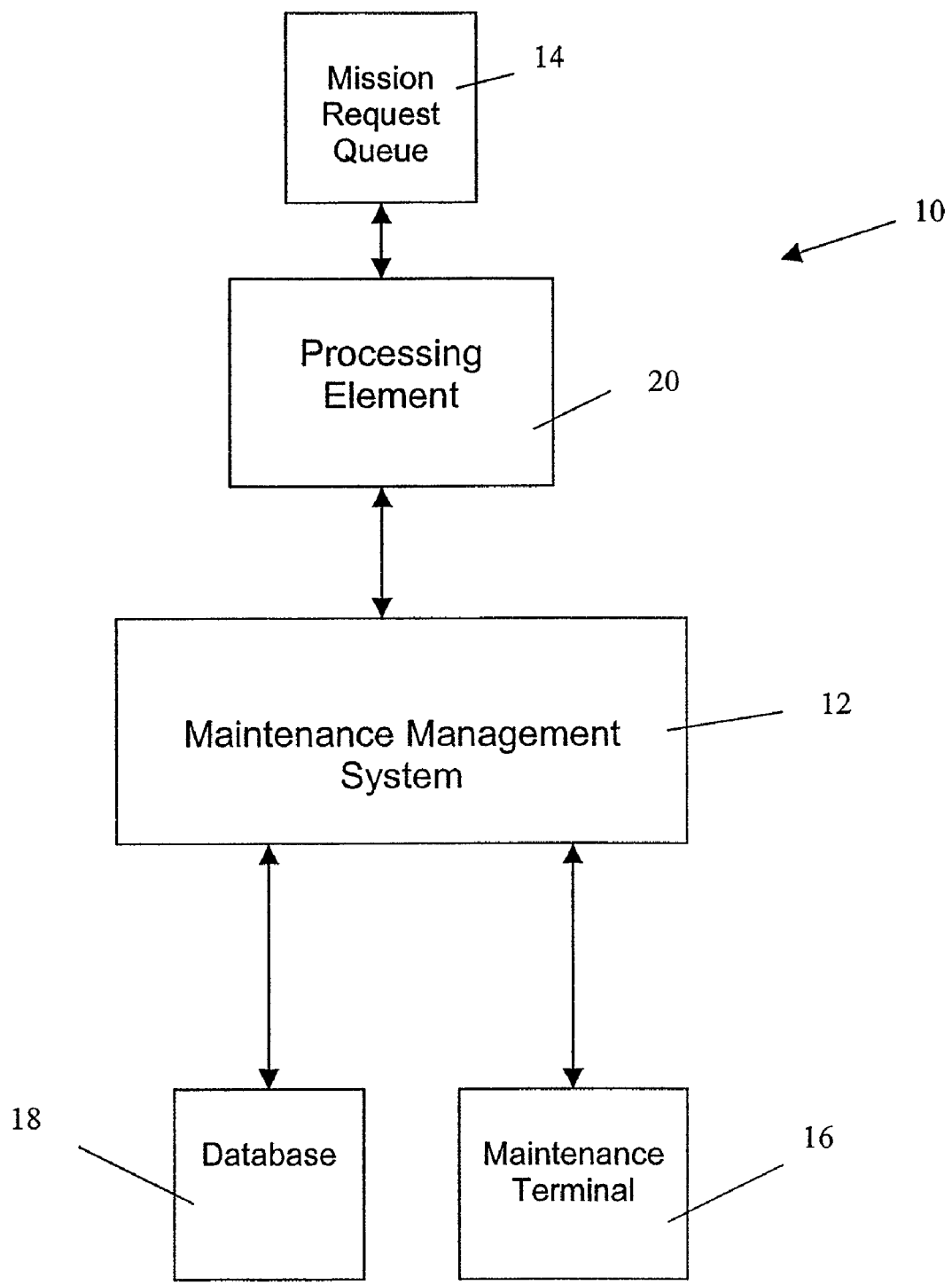
Figure 2:
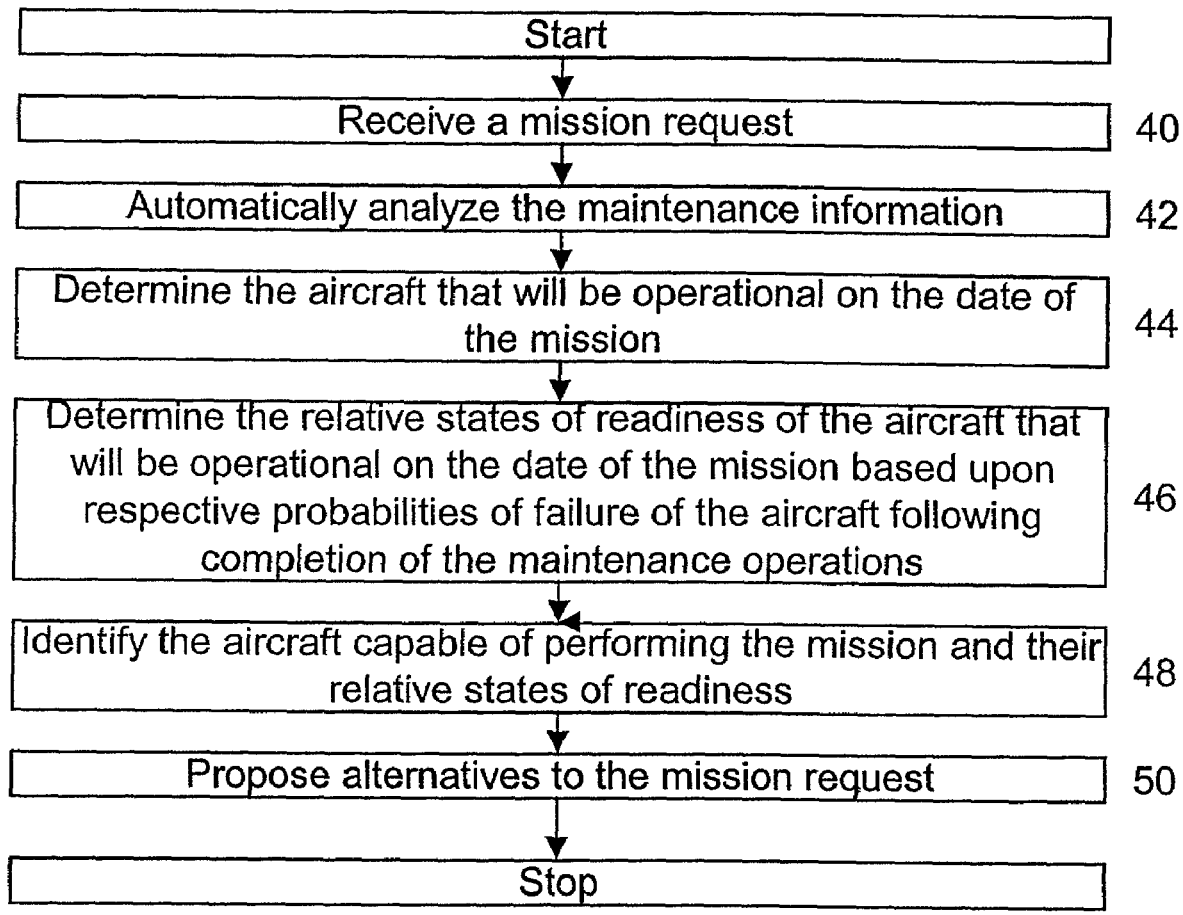
Figure 3:
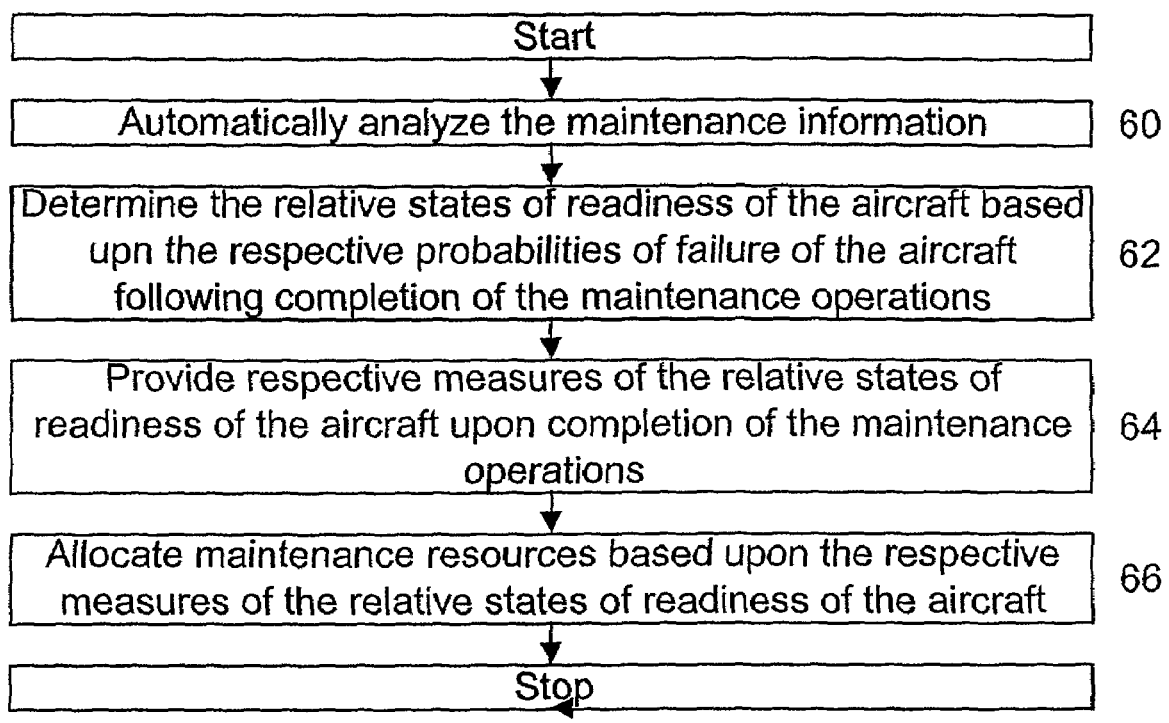

Having thus described the invention in general terms, reference will now be made to the accompanying drawings, which are not necessarily drawn to scale, and wherein:

FIG. 1 is a block diagram of a system for assessing the readiness of a fleet of aircraft and for analyzing maintenance operations performed upon a fleet of aircraft according to an embodiment of the present invention;

FIG. 2 is a flow chart illustrating the operations performed to assess the readiness of a plurality of repairable systems, such as a plurality of aircraft, according to one embodiment of the present invention; and FIG. 3 is a flow chart illustrating the operations performed to automatically analyze the maintenance operations performed upon a plurality of repairable systems, such as a plurality of aircraft, according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a block diagram depicting the interaction of a method and system 10 according to one embodiment of the present invention with a conventional maintenance management system 12 is depicted. While the system and method of this embodiment of the present invention are illustrated and will be described in conjunction with the analysis of the maintenance operations performed upon a fleet of aircraft, the system and method can be utilized in conjunction with a wide variety of other repairable systems, typically electromechanical systems.

As shown in FIG. 1 and in block 40 of FIG. 2, the method and system 10 of the present invention receive a system allocation request, such as a mission request. A mission request may include a variety of parameters depending upon the mission but typically includes the number of aircraft required for the mission, a projected date of the mission, an indication as to whether the mission may be postponed, the relative urgency or ranking of the mission and the like. Moreover, the mission request may define any particular characteristics, such as the minimum equipment, that will be required of the aircraft selected for the mission. Although not necessary for the practice of the present invention, the mission request(s) may be compiled in a queue 14 and provided in various fashions, such as in a chronological fashion or based upon the relative urgency or ranking of the missions.

Based upon the mission request, the method and system 10 of the present invention will analyze the current status of the fleet of aircraft and provide a response indicating the aircraft that will be available to fly the mission as well as an indication of the relative states of readiness of the aircraft as shown generally by FIG. 2. In order to provide this information, the system and method of the present invention interfaces with a conventional maintenance management system 12. The maintenance management system typically provides dynamic resource management by identifying candidate maintenance operations that should be performed upon an aircraft. In this regard, the maintenance management system may determine candidate maintenance actions based upon predefined maintenance requirements and procedures as well as information relating to the aircraft, such as the age, the flight time and prior maintenance activities performed upon the aircraft. As such, the maintenance management system can identify aircraft that should undergo scheduled maintenance of one or more subsystems. As indicated by FIG. 2, the maintenance management system may include or communicate with a database 18 that includes a wide variety of data relating to the aircraft, such as the aircraft configuration by tail number, and the maintenance history of the aircraft as well as the available and scheduled maintenance resources. In addition, the maintenance management system may receive input from maintenance personnel who arrange for otherwise unscheduled maintenance operations, such as to repair particular subsystems that have exhibited a fault. The maintenance personnel can provide this information in various manners, such as via a maintenance terminal 16 as illustrated in FIG. 1. For example, the maintenance management system and associated maintenance terminal may be the maintenance systems provided by Aero Info, Inc. of Sonora, Calif.

Based upon the candidate maintenance operations, the maintenance management system 12 will schedule the aircraft for maintenance based upon the resources available and prior commitments for those resources. As such, the maintenance management system serves a scheduling function. In addition, the maintenance management system will monitor maintenance activity and update the maintenance records associated with the aircraft as various maintenance operations are performed and completed. Based upon the data maintained by the maintenance management system, the method and system 10 of the present invention can therefore determine the aircraft that will be operational on the projected date of a mission. See blocks 42 and 44. In this regard, the aircraft that will be available for a mission generally includes aircraft that are not currently scheduled to undergo maintenance as well as those aircraft undergoing maintenance that will be completed by the projected date of the mission.

In addition to identifying the aircraft that will be operational on the projected date of the mission, the method and system 10 of the present invention also provide an indication or measure of the relative states of readiness of the aircraft identified to be capable of performing the requested mission. See block 46. In this regard, the system and method of the present invention are designed to determine the relative states of readiness based upon the respective probabilities of failure or, conversely, success of the aircraft upon completion of the maintenance operations. In comparison to conventional techniques that consider a repaired system as being as good-as-new or as bad-as-old, the system and method of the present invention determines the relative states of readiness across the continuum extending from as good-as-new to as bad-as-old. As such, the system and method of the present invention provide a more accurate indication of the relative states of readiness of the aircraft such that an aircraft can be assigned to the mission in a more educated fashion with a greater degree of confidence that the aircraft will be able to successfully complete the mission without failure of any of the subsystems.

The method and system 10 of the present invention can be configured to utilize various probabilistic techniques to provide respective measures of the relative states of readiness of the aircraft, or other repairable systems. In one advantageous embodiment, the method and system determine the type of process that describes the probability of failure of the aircraft and, based upon the type of process, provide the measures of the relative states of readiness of the aircraft. For example, measures of the relative states of readiness of the aircraft are typically based upon the intensity function associated with the type of process that describes the probability of failure of the aircraft. However, other measures, such as parameters associated with the type of process that describes the probability of failure of the aircraft, may be utilized as described below.

Initially, the method and system 10 analyzes the relative states of readiness of the aircraft based upon a modulated power law process, although the method and system may subsequently determine that the process that describes the probability of failure of an aircraft is actually a more specific form of the modulated power law process, such as a gamma renewal process, a homogenous Poisson process or a power law process, thereby permitting the measures of the relative states of readiness of the aircraft to be refined. As known to those skilled in the art, and as described by the Black article, the modulated power law process is a three-parameter stochastic point process model that can be used to describe the failure times of a repairable system. As also known to those skilled in the art, the three-parameters are kappa, theta and beta. As described hereinafter, maximum likelihood estimates are obtained for each of the three model parameters. Thereafter, confidence intervals and hypothesis tests are performed for the parameters in order to provide a degree of reliability for the estimated parameters.

In order to obtain the maximum likelihood estimates for the three-parameters, a joint probability density function is initially defined for the first n failure times $t_1 > t_2 > \ldots > t_n$ of an aircraft in response to shocks or events, such as flights, as follows:

$$f(t_1, t_2, \ldots, t_n) = \left\{ \prod_{i=1}^{n} u(t_i)[U(t_i) - U(t_{i-1})]^{k-1} \right\} \times \frac{\exp[-U(t_i)]}{[\Gamma(k)]^n} \quad (1)$$

wherein u(t) is the intensity function of a nonhomogenous Poisson process that is defined as follows:

$$u(t) = \frac{\beta}{\theta}\left(\frac{t}{\theta}\right)^{\beta-1}, t > 0 \quad (2)$$

and wherein U(t) is the expected number of shocks before time t and is defined as $$U(t) = \int_0^t u(x)dx \quad (3)$$

and further wherein according to a nonhomogenous Poisson process a failure occurs not at every shock but at every $\kappa^{th}$ shock with κ being a positive value. For example, if kappa=4, then every fourth shock would cause a failure.

Kappa is a measure of the improvement effected by a repair such that for larger values of kappa, the improvement provided by the repair will be more significant. Conversely, beta is a measure of the improvement or deterioration of a system over the course of the life of the system. In addition, theta is a scaling parameter that is typically utilized to change units, such as from a week to a month.

For the nonhomogenous Poisson processes having the power law process intensity set forth by equation (2), the log likelihood function of the joint probability density function of equation (1) can be presented as follows:

$$\ell(\theta, \beta, \kappa \mid t_1, t_2, \ldots, t_n = \ell n L(\theta, \beta, \kappa) \quad (4)$$
$$= -\left(\frac{t_n}{\theta}\right)^{\beta} + n\ell n\beta - n\ell n\Gamma(\kappa) - n\beta\kappa\ell n\theta +$$
$$(\beta - 1)\sum_{i=1}^{n}\ell n t_1 + (\kappa - 1)\sum_{i=1}^{n}\ell n\left(t_i^{\beta} - t_{i-1}^{\beta}\right)$$

In order to determine the maximum likelihood estimates of the three parameters, beta, theta and kappa, the partial derivatives of the function l set forth by equation (4) are taken and set equal to zero as follows:

$$\frac{\partial \ell}{\partial \theta} = 0 = \frac{\beta}{\theta}\left(\frac{t_n}{\theta}\right)^{\beta} - \frac{n\beta\kappa}{\theta} \quad (5)$$

$$\frac{\partial \ell}{\partial \beta} = 0 \quad (6)$$
$$= -\left(\frac{t_n}{\theta}\right)^{\beta}\ell n\frac{t_n}{\theta} + \frac{n}{\beta} - n\kappa\ell n\theta + \sum_{i=1}^{n}\ell n t +$$
$$(\kappa - 1)\sum_{i=1}^{n}\frac{t_i^{\beta}\ell n t_i - t_{i-1}^{\beta}\ell n t_{i-1}}{t_i^{\beta} - t_i^{\beta} - 1}$$

$$\frac{\partial \ell}{\partial \kappa} = 0 = n\psi(\kappa) - n\beta\ell n\theta + \sum_{i=1}^{n}\ell n\left(t_i^{\beta} - t_{i-1}^{\phi}\right). \quad (7)$$

By solving for beta, theta and kappa, the maximum likelihood estimate for each parameter is obtained. Various methods can be utilized to solve for these parameters including the Newton-Raphson method and the Nelder-Mead simplex algorithm. In one advantageous embodiment, however, a combination of the Nelder-Mead simplex algorithm and the Newton-Raphson method provides an efficient and reliable algorithm for determining the maximum likelihood estimates of the three parameters. In this regard, several iterations of the Nelder-Mead algorithm are performed, such as about 50 iterations, with the last point of this iterative scheme being utilized as the initial point of the Newton-Raphson method. Other details regarding this solution technique are provided by the Black article.

Based upon the maximum likelihood estimates for the three parameters, the relative states of readiness of the aircraft can be approximated. In this regard, kappa is a measure of the improvement effected by a repair, while beta is a measure of the improvement or deterioration of a system over the course of its life.

Since the maximum likelihood estimates of the three parameters are estimates, the method and system 10 of the present invention may also determine confidence intervals and/or hypothesis tests for the parameters in order to develop greater confidence that the maximum likelihood estimates are accurate. The confidence intervals are typically derived using asymptotic approaches. The asymptotic distribution of the estimate for each of the three parameters has a multivariate normal distribution with a mean μ defined as μ=[θ, β, κ,] and a variance defined by a co-variance matrix $[J(\theta, \beta, \kappa)]^{-1}$. In this regard, the J matrix is comprised of second partial derivatives of the log likelihood function set forth in equation (4) and is represented as follows:

$$J(\theta, \beta, \kappa) = \begin{bmatrix} \frac{\partial^2 \ell}{\partial \theta^2} & \frac{\partial^2 \ell}{\partial \theta \partial \beta} & \frac{\partial^2 \ell}{\partial \theta \partial \kappa} \\ \frac{\partial^2 \ell}{\partial \theta \partial \beta} & \frac{\partial^2 \ell}{\partial \beta^2} & \frac{\partial^2 \ell}{\partial \beta \partial \kappa} \\ \frac{\partial^2 \ell}{\partial \theta \partial \kappa} & \frac{\partial^2 \ell}{\partial \beta \partial \kappa} & \frac{\partial^2 \ell}{\partial \kappa^2} \end{bmatrix} \quad (8)$$

Based upon the covariance matrix, the confidence intervals for each of the parameters are defined as follows:

$$\hat{\theta} \pm z_{\alpha/2} \sqrt{(1,1) \text{ entry in } [J(\hat{\theta}, \hat{\beta}, \hat{\kappa})]^{-1}} \quad (9)$$

$$\hat{\beta} \pm z_{\alpha/2} \sqrt{(2,2) \text{ entry in } [J(\hat{\theta}, \hat{\beta}, \hat{\kappa})]^{-1}} \quad (10)$$

$$\hat{\kappa} \pm z_{\alpha/2} \sqrt{(3,3) \text{ entry in } [J(\hat{\theta}, \hat{\beta}, \hat{\kappa})]^{-1}} \quad (11)$$

whenever $\hat{\theta}$, $\hat{\beta}$ and $\hat{\kappa}$ are the maximum likelihood estimates of theta, beta and kappa, respectively. As known to those skilled in the art, z indicates that the parameters have a standard normal distribution and can be obtained from a look-up table or the like. See, for example, Lee J. Bain and Max Engelhardt, Introduction to Probability and Mathematical Statistics, P. W. S. Kent (1987). In addition, alpha is based upon the confidence interval. For example, in instances in which the confidence intervals are the 95% confidence intervals such that there is a 95% likelihood that the parameter will fall within the range defined by the interval, alpha will equal 0.05. Likewise, a 90% confidence interval would have alpha equal to 0.10 and a 99% confidence interval would have alpha equal to 0.01.

Based upon the confidence intervals, the degree of reliability of the maximum likelihood estimates for the parameters can be determined with parameters having larger confidence intervals somewhat less certain than parameters having smaller confidence intervals. In order to provide a further indication of the reliability of the maximum likelihood estimates, the method and system 10 of the present invention may also test several hypotheses. In this regard, there are several special and more specific cases of the modulated power law process, such as in instances in which kappa equals 1 in which the modulated power law process reduces to the power law process, instances in which beta equals 1 in which the modulated power law process reduces to the gamma renewal process and instances in which both beta and kappa equal 1 in which the modulated power law process reduces to the homogeneous Poisson process. In order to determine the proper process for modeling the probability of failure of the aircraft or other repairable system, the likelihood ratio test statistic is determined for each instance as follows:

$$\lambda = \frac{\max_{(\theta,\beta,\kappa) \in H_0} \ell(\theta, \beta, \kappa)}{\max_{(\theta,\beta,\kappa)} \ell(\theta, \beta, \kappa)} \quad (12)$$

wherein $(\theta, \beta, \kappa) \in H_0$ represents those values of $(\theta, \beta, \kappa)$ that satisfy the null hypothesis, i.e., $\kappa=1$, $\beta=1$ or $\kappa=\beta=1$. For all three hypothesis, the denominator is the maximum of the log likelihood function with no restrictions on the parameters. In other words, the denominator is the log likelihood function evaluated at the maximum likelihood estimates $\hat{\theta}$, $\hat{\beta}$, $\hat{\kappa}$ as set forth below:

$$\max_{(\theta,\beta,\kappa)} \ell(\theta, \beta, \kappa) = \ell(\hat{\theta}, \hat{\beta}, \hat{\kappa}) \quad (13)$$

As will be apparent, the numerator will depend on which hypothesis is being tested. In order to test the likelihood of $\kappa=1$ in which the modulated power law process reduces to the power law process versus the likelihood of $\kappa \neq 1$, the numerator is the maximum of the log likelihood function under the restriction that $\kappa=1$. But if $\kappa=1$ then the log likelihood function is just the log likelihood function for the power law process, which achieves its maximum when:

$$\hat{\beta}_1 = \frac{n}{\sum_{i=1}^{n-1} \ell n(t_n/t_i)} \quad (14)$$

and $$\hat{\theta}_1 = \frac{t_n}{n^{1/\hat{\beta}_1}}. \quad (15)$$

The numerator is thus $$\max_{(\theta,\beta,\kappa) \in H_0} \ell(\theta, \beta, \kappa) = \ell(\hat{\theta}_1, \hat{\beta}_1, 1). \quad (16)$$

Thus the likelihood ratio test statistic for testing the hypothesis in which $\kappa=1$ is:

$$\lambda_1 = \frac{\ell(\hat{\theta}_1, \hat{\beta}_1, 1)}{\ell(\hat{\theta}, \hat{\beta}, \hat{\kappa})} \quad (17)$$

Typically, the null hypothesis that $\kappa=1$ is rejected if $-2 \ln \lambda_1 > \chi_{1-a}^2(1)$ wherein $\chi_{1-a}^2$ is a chi-square distribution as known to those skilled in the art and the (1) represents the number of restrictions on the parameters. However, it should be understood that the method and system may utilize other tests or thresholds for determining if a null hypothesis is to be accepted or rejected.

In order to test the hypothesis in which $\beta$ is equal to one and the modulated power law process reduces to a gamma renewal process in which the system does not experience deterioration throughout its lifetime, although it may experience degradation during the times between failures, i.e. a repaired unit is in exactly the same condition as a new unit, the denominator in the likelihood ratio test statistic is the log likelihood function evaluated at the maximum likelihood estimates, as shown in equation (13). The numerator in the likelihood ratio statistic is equal to:

$$\max_{(\theta,\beta,\kappa) \in H_0} \ell(\theta, \beta, \kappa) = \ell(\hat{\theta}_2, \hat{\beta}_{21}, \hat{\kappa}_2) \quad (18)$$

wherein $\hat{\theta}_2$ and $\hat{\kappa}_2$ are the estimates of $\theta$ and $\kappa$ under the assumption that $\beta=1$. Therefore, the parameters $\theta$ and $\kappa$ of a gamma renewal process must be estimated. The maximum likelihood estimates of $\theta$ and $\kappa$ do not have closed form expressions and must be approximated by a numerical procedure. In this regard, let $X_1=T_1, X_2=T_2-T_1, \ldots, X_n=T_n-T_{n-1}$ denote the times between failures. Then $X_1, X_2, \ldots, X_n$ form a random sample of size n from the gamma distribution with parameters $\theta$ and $\kappa$. Differentiating the likelihood function and setting the results equal to zero leads to the following equations:

$$\ell n \hat{\kappa}_2 - \Gamma'(\hat{\kappa}_2)/\Gamma(\hat{\kappa}_2) - \ell n(\bar{x}/\tilde{x}) = 0 \quad (19)$$

and $$\hat{\theta}_2 = \frac{\bar{x}}{\hat{\kappa}_2} \quad (20)$$

wherein $\tilde{x}$ is the sample median. An iterative method such as Newton's method is required to solve the first equation for $\kappa_2$. Once $\kappa_2$ is obtained, the equation (2) gives a closed form expression for $\hat{\theta}_2$. See the Black article for a further discussion of the iterative method.

Given $\hat{\theta}_2$ and $\hat{\kappa}_2$, these values may be substituted into the log likelihood function to obtain:

$$\lambda_2 = \frac{\ell(\hat{\theta}_2, 1, \hat{\kappa}_2)}{\ell(\hat{\theta}, \hat{\beta}, \hat{\kappa})} \quad (21)$$

Again, the null hypothesis that $\beta=1$ is generally rejected if $-2 \ln \lambda_2 > \chi_{1-\alpha}^2 (1)$. However, it should be understood that the system and method may employ other criteria in determining the acceptability of the null hypothesis, if so desired.

Finally, the hypothesis in which $\kappa=1$, $\beta=1$ can be tested in which the modulated power law process reduces to the homogeneous Poisson process. If this hypothesis is true, the times between failure are independent and identically distributed exponential random variables, so the maximum likelihood estimate of $\theta$ is:

$$\hat{\theta}_3 = \frac{t_n}{n}. \quad (22)$$

The likelihood ratio test statistic is thus $$\lambda_3 = \frac{\ell(\hat{\theta}_3, 1, 1)}{\ell(\hat{\theta}, \hat{\beta}, \hat{\kappa})} \quad (23)$$

Once again, the hypothesis is typically rejected if $-2 \ln \lambda_3 > \chi_{1-\alpha}^2 (2)$, although other tests or thresholds may be utilized if desired.

Based upon the hypothesis testing, the method and system obtain additional information relating to the maximum likelihood estimates. For example, the hypothesis testing may determine that the modulated power law process can be reduced to a power law process, a gamma renewal process or a homogeneous Poisson process. In these instances, the anticipated behavior of the repairable system, such as the probability of failure of the repairable system, can also be determined with greater reliability and precision.

While various measures of the relative states of readiness of an aircraft or other repairable system may be generated, the method and system 10 of one embodiment determine the probability of failure of the repairable system based upon an analysis of the complete intensity function appropriate for the process that best models the repairable system. In instances in which the hypothesis testing does not lead to the repairable system being modeled as one of the more specific processes, such as a power law process, a gamma renewal process or a homogeneous Poisson process, a measure of the relative state of readiness of an aircraft or other repairable system is generated based upon an analysis of the complete intensity function of a modulated power law process. In this regard, the complete intensity function of a modulated power law process is defined as follows:

$$u(t \mid t_{n-1}) = \left\{ \int_t^\infty \left(\frac{x}{t}\right)^{\beta-1} \left(\frac{x^\beta - t_{n-1}^\beta}{t^\beta - t_{n-1}^\beta}\right)^{\kappa-1} \times \exp\left\{-\left(\frac{x}{\theta}\right)^\beta + \left(\frac{t}{\theta}\right)^\beta\right\} dx \right\}^{-1} \quad (24)$$

Since the solution of the foregoing equation defines the probability of failure of the repairable system, the solution also defines the relative state of readiness of the repairable system. In instances in which the process that best models the repairable system is a power law process, gamma renewal process or a homogenous Poisson process, the relative state of readiness of the repairable system may be determined in an analagous manner by solving the complete intensity function associated with the respective type of process. In this regard, the complete intensity functions associated with these other more specific types of processes are well known to those skilled in the art.

As mentioned above, the method and system 10 may determine a measure of the relative state of readiness of a repairable system in other manners without departing from the spirit and scope of the present invention. For example, in instances in which the values of beta for a number of repairable systems are substantially equal, the respective values of kappa for the repairable systems may be directly utilized to provide a measure of the relative state of readiness of a repairable system.

In addition to merely identifying the aircraft that will be operational on the date of the requested mission such as by determining the aircraft for which maintenance operations will be completed by the date of the upcoming mission, the system and method can therefore provide respective measures of the relative states of readiness of the aircraft identified to be operational on the date of the requested mission. See block 48. As described above, various measures of the relative states of readiness of the aircraft can be provided with an objective of selecting the aircraft having the greatest likelihood of completing the mission based upon the identification of the aircraft having greatest states of readiness in order to maximize the probability of success of the mission.

The system and method of the present invention may also propose a modification of the mission request if the proposed modification would increase the relative states of readiness of the aircraft operational on the date of the modified mission in comparison to the relative states of readiness of the aircraft operational on the date of the requested mission. See block 50. In this regard, if the mission request indicates that the date of the mission may be postponed and/or if the urgency or importance of the mission is relatively low, the system and method may determine if aircraft that are undergoing maintenance and that will not be ready on the initial date of the requested mission will have a greater state of readiness upon the completion of the maintenance operations than the aircraft that will be ready to fly upon the date of the original mission. If so, the system and method may propose to delay the mission such that the maintenance operations for these additional aircraft may be completed in order for the aircraft that are scheduled for the mission to greater state of readiness, on average, than if the mission were performed as originally scheduled. The mission commander may then opt to delay the mission in order to improve the overall state of readiness of the aircraft or may elect to continue with the mission as originally planned. While one example has been provided, it should be understood that the system and method can propose a variety of other modifications to the mission request in order to increase the relative states of readiness of the aircraft, if so desired.

As shown in FIG. 3, a method is also provided according to another aspect of the present invention for analyzing maintenance operations performed upon the fleet of aircraft or other repairable systems. In this regard, the maintenance information associated with the aircraft is analyzed to determine the relative states of readiness of the aircraft upon completion of the maintenance operations scheduled for the aircraft. See blocks 60 and 62 of FIG. 3. As described above, respective measures of the relative states of readiness of the aircraft upon completion of the maintenance operations scheduled for the aircraft are provided. See block 64. As described above, measures of the probability of failure may be provided for each aircraft based upon, for example, an analysis of the complete intensity function appropriate for the type of process that best models the aircraft, in order to provide an indication of the relative states of readiness of the aircraft. According to this aspect of the present invention, the system and method may allocate the maintenance resources such as maintenance personnel, equipment, floor space and the like based upon the respective measures of the relative states of readiness of the plurality of aircraft. See block 66. For example, the maintenance resources may be prioritized in order to complete the maintenance operations ahead of time for the aircraft that will have the greatest states of readiness upon completion of the maintenance operation. As such, the aircraft that will have the greatest states of readiness can be returned to the fleet for active duty in the shortest period of time.

The system 10 of the present invention is typically embodied by a processing element 20 and an associated memory device, both of which are commonly comprised by a computer or the like. As such, the system of the present invention generally operates under control of a computer program product according to another aspect of the present invention. The computer program product for performing the contingent claim valuation includes a computer-readable storage medium, such as the non-volatile storage medium, and computer-readable program code portions, such as a series of computer instructions, embodied in the computer-readable storage medium.

In this regard, FIGS. 1-3 are block diagrams and flowcharts of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Therefore, the method and system 10 of the present invention permit the relative states of readiness of a fleet of aircraft to be determined in an automated fashion such that more educated decisions can be made during the process of selecting the aircraft to fly a mission so as to maximize the likelihood of the aircraft successfully completing the mission. Similarly, an automated method of analyzing the maintenance operations performed upon a fleet of aircraft is provided such that the allocation of the maintenance resources can be performed in an educated manner based upon the respective measures of the relative states of readiness of the aircraft, thereby permitting the aircraft having the greatest states of readiness to be returned to service in the shortest period of time. While the system, method, and computer program product of the present invention have been primarily described above in the context of maintenance operations performed upon a fleet of aircraft, the method, system and computer program product of the present invention can likewise analyze the maintenance operations performed upon any of a wide variety of repairable systems in order to optimize resource allocation and the scheduling of maintenance operations.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An automated method of analyzing maintenance operations performed upon a fleet of aircraft comprising:
automatically analyzing maintenance information associated with the plurality of aircraft, with a processing element of a computer, to determine relative states of readiness of the plurality of aircraft upon completion of the maintenance operations scheduled for the plurality of aircraft based upon respective probabilities of failure of the aircraft following completion of the maintenance operations, wherein determining the relative states of readiness based upon respective probabilities of failure of the aircraft following completion of the maintenance operations comprises determining the relative states of readiness based upon an intensity function appropriate for the type of process that describes the probability of failure of the aircraft;

providing respective measures of the relative states of readiness of the plurality of aircraft upon completion of the maintenance operations scheduled for the plurality of aircraft; and allocating maintenance resources based upon the respective measures of the relative states of readiness of the plurality of aircraft.

2. A method according to claim 1 wherein allocating maintenance resources comprises prioritizing the maintenance operations scheduled for the aircraft that will have the greatest state of readiness upon completion of the maintenance operations.

3. An automated method of analyzing maintenance operations performed upon a plurality of repairable systems comprising:

analyzing maintenance information associated with the plurality of repairable systems to determine relative states of readiness of the plurality of repairable systems;

determining respective measures of the relative states of readiness of the repairable systems, with a processing element of a computer, based upon respective probabilities of failure of the repairable systems following completion of the maintenance operations, wherein determining the respective measures of the relative states of readiness of the repairable systems comprises providing respective measures of the relative states of readiness of the repairable systems that will be operational on the date of the requested system allocation based upon an intensity function appropriate for the type of process that describes the probability of failure of the repairable system; and allocating maintenance resources based upon the respective measures of the relative states of readiness of the plurality of repairable systems.

4. A method according to claim 3 wherein allocating maintenance resources comprises prioritizing the maintenance operations scheduled for the repairable systems that will have the greatest state of readiness upon completion of the maintenance operations.

5. A method according to claim 3 wherein determining the relative states of readiness comprises determining the relative states of readiness based upon respective probabilities of failure of the repairable systems following completion of the maintenance operations.

6. An automated method of analyzing maintenance operations performed upon a fleet of aircraft comprising:

automatically analyzing maintenance information associated with the plurality of aircraft, with a processing element of a computer, to determine relative states of readiness of the plurality of aircraft upon completion of the maintenance operations scheduled for the plurality of aircraft;

providing respective measures of the relative states of readiness of the plurality of aircraft upon completion of the maintenance operations scheduled for the plurality of aircraft; and allocating maintenance resources based upon the respective measures of the relative states of readiness of the plurality of aircraft, wherein allocating maintenance resources comprises prioritizing the maintenance resources to complete the maintenance operations for the aircraft having a greatest relative state of readiness upon completion of the maintenance operations scheduled for the aircraft.

7. A method according to claim 6 wherein determining the relative states of readiness comprises determining the relative states of readiness based upon respective probabilities of failure of the aircraft following completion of the maintenance operations.

8. A method according to claim 7 wherein determining the relative states of readiness based upon respective probabilities of failure of the aircraft following completion of the maintenance operations comprises determining the relative states of readiness based upon an intensity function appropriate for the type of process that describes the probability of failure of the aircraft.

9. An automated method of analyzing maintenance operations performed upon a plurality of repairable systems comprising:

analyzing maintenance information associated with the plurality of repairable systems to determine relative states of readiness of the plurality of repairable systems;

determining respective measures of the relative states of readiness of the repairable systems, with a processing element of a computer, based upon respective probabilities of failure of the repairable systems following completion of the maintenance operations; and allocating maintenance resources based upon the respective measures of the relative states of readiness of the plurality of repairable systems, wherein allocating maintenance resources comprises prioritizing the maintenance resources to complete the maintenance operations for the repairable system having a greatest relative state of readiness upon completion of the maintenance operations scheduled for the repairable systems.

10. A method according to claim 9 wherein determining the respective measures of the relative states of readiness of the repairable systems comprises providing respective measures of the relative states of readiness of the repairable systems that will be operational on the date of the requested system allocation based upon an intensity function appropriate for the type of process that describes the probability of failure of the repairable system.

\* \* \* \* \*